United States Patent
Bardsley et al.

(10) Patent No.: US 7,308,714 B2
(45) Date of Patent: Dec. 11, 2007

(54) LIMITING THE OUTPUT OF ALERTS GENERATED BY AN INTRUSION DETECTION SENSOR DURING A DENIAL OF SERVICE ATTACK

(75) Inventors: Jeffrey Scott Bardsley, Cary, NC (US); Ashley Anderson Brock, Morrisville, NC (US); Nathaniel Wook Kim, Raleigh, NC (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/966,227

(22) Filed: Sep. 27, 2001

(65) Prior Publication Data

US 2003/0061514 A1    Mar. 27, 2003

(51) Int. Cl.
G06F 21/00 (2006.01)
G06F 7/04 (2006.01)
G06F 15/173 (2006.01)
G06F 11/00 (2006.01)

(52) U.S. Cl. .................. 726/23; 709/223; 709/224; 713/155; 713/168; 713/188

(58) Field of Classification Search ............ 713/201; 709/223–224; 726/23
See application file for complete search history.

(56) References Cited

U.S. PATENT DOCUMENTS 5,440,688 A * 8/1995 Nishida ........................ 714/4

| 5,919,258 A | | 7/1999 | Kayashima et al. ........ 713/201 |
| 6,006,016 A | * | 12/1999 | Faigon et al. ................. 714/48 |
| 6,012,087 A | * | 1/2000 | Freivald et al. ............. 709/218 |
| 6,070,191 A | * | 5/2000 | Narendran et al. ......... 709/226 |
| 6,279,113 B1 | * | 8/2001 | Vaidya ........................ 713/201 |

(Continued)

FOREIGN PATENT DOCUMENTS

WO    00/62167    10/2000

OTHER PUBLICATIONS

Lunt, Teresa, "Detecting Intruders in Computer Systems", 1993 Conference of Auditing and Computer Systems, www.alw.nih.gov/Security/FIRST/papars/unix/nides/canada93.ps.*

(Continued)

*Primary Examiner*—Syed A. Zia
*Assistant Examiner*—Matthew T Henning
(74) *Attorney, Agent, or Firm*—Schmeiser, Olsen & Watts; David R. Irvin; John R. Pivnichny

(57) ABSTRACT

An intrusion detection system is improved by altering its signatures and thresholds during a denial of service attack, in order to decrease the rate at which an intrusion detection sensor sends alerts to an intrusion detection server. A governor within the sensor is associated with each signature. The governor may include an alert log, a timer, an alert-generation-rate threshold, and rules that prescribe actions to be taken when the alert-generation-rate threshold is exceeded. The governor records the generation time of each alert by the sensor, and determines the rate at which the sensor is presently generating alerts. When the present alert-generation rate exceeds the alert-generation-rate threshold, the governor alters the associated signature threshold to decrease the alert generation rate of the intrusion detection sensor.

12 Claims, 5 Drawing Sheets

U.S. PATENT DOCUMENTS

| | | | |
|---|---|---|---|
| 6,328,135 B1* | 12/2001 | Sirag et al. | 187/382 |
| 6,425,006 B1* | 7/2002 | Chari et al. | 709/224 |
| 6,487,204 B1* | 11/2002 | Dacier et al. | 370/395.2 |
| 6,487,666 B1* | 11/2002 | Shanklin et al. | 713/201 |
| 6,513,129 B1* | 1/2003 | Tentij et al. | 714/4 |
| 6,570,968 B1* | 5/2003 | Marchand et al. | 379/114.14 |
| 6,704,874 B1* | 3/2004 | Porras et al. | 726/22 |
| 6,725,377 B1* | 4/2004 | Kouznetsov | 726/23 |
| 6,772,349 B1* | 8/2004 | Martin et al. | 713/201 |
| 6,826,697 B1* | 11/2004 | Moran | 726/23 |
| 6,909,692 B1* | 6/2005 | Sharma et al. | 370/232 |
| 6,928,556 B2* | 8/2005 | Black et al. | 713/400 |
| 6,981,280 B2* | 12/2005 | Grupe | 726/22 |
| 6,996,843 B1* | 2/2006 | Moran | 726/23 |
| 7,032,114 B1* | 4/2006 | Moran | 713/187 |
| 7,069,588 B2* | 6/2006 | Call et al. | 726/22 |
| 7,203,962 B1* | 4/2007 | Moran | 726/23 |

OTHER PUBLICATIONS

Muller, N. J. 1997. Improving Network Operations With Intelligent Agents. Int. J. Netw. Manag. 7, 3 (Jul. 1997), 116-126.*

Kargl, F., Maier, J., and Weber, M. 2001. Protecting web servers from distributed denial of service attacks. In Proceedings of the 10th international Conference on World Wide Web (Hong Kong, Hong Kong, May 1-5, 2001). WWW '01. ACM Press, New York, NY, 514-524.*

IBM Technical Disclosure Bulletin, vol. 39, No. 09. Sep. 1996 "Security Feature for Local Area Network Switches".

Feingold, R. et al. "Verifying the Secure Setup of Unix Client/Servers and Detection of Network Intrusion", Proceedings of the SPIE, The International Society for Optical Engineering, vol. 2616, pp. 55-64, 1996.

Nong, Ye et al. "Application of Decision Tree Classifiers to Computer Intrusion Detection", Data Mining II. Second International Conference on Data Mining, pp. 381-390, Jul. 2000.

Hashim, SJ et al. "Computer Network Intrusion Detection Software Development" 2000 TENCON Proceedings. Intelligent Systems and Technologies for the New Millennium, IEEE Region 10, vol. 3, pp. 117-123, 2000.

Kent, S. "On the Trail of Intrusions into Information Systems" IEEE Spectrum, vol. 37, No. 12, pp. 52-56, Dec. 2000.

Wen, BS "Open-Source Intrusion-Detection Tools for Linux" Linux Journal, No. 78, pp. 104-110, Oct. 2000.

Dickerson, JE et al. "Fuzzy Network Profiling for Intrusion Detection", PeachFuzz 2000. 19th International Conference of the North American Fuzzy Information Processing Society, IEEE System, pp. 301-306, Jul. 2000.

Manganaris, S. et al. "A Data Mining Analysis of RTID Alarms" IBM Corp. Computer Networks, vol. 34, No. 4, pp. 571-577, Oct. 2000.

Petersen, KL. "IDA—Intrusion Detection Alert", Proceedings, The Sixteenth Annual International Computer Software and Applications Conference, IEEE, pp. 306-311, Sep. 1992.

* cited by examiner

U.S. 7,308,714 B2

LIMITING THE OUTPUT OF ALERTS GENERATED BY AN INTRUSION DETECTION SENSOR DURING A DENIAL OF SERVICE ATTACK

FILED OF THE INVENTION

The present invention applies generally to the field of computer security, and more particularly to an improved intrusion detection system that protects a computer system from electronic denial-of-service attacks by vandals.

BACKGROUND

Computer-based activities are now subject to electronic vandalism. A vandal, who is sometimes called a hacker in this context, may attempt to intrude upon a computer system in order to steal information in an act of industrial espionage, or to alter records to the detriment or the benefit of another party's interests or reputation, or to impede the operation of the computer by implanting a virus or by flooding the computer with bogus information.

Computers are often protected against vandals' intrusions by intrusion detection systems. An intrusion detection system monitors the activities of users and would-be users for particular events or patterns of events generally known as signatures. A signature is a set of events and transition functions that define a sequence of actions that constitute misuse or unauthorized use of the computer. For example, a misuse engine that relies upon signature monitoring is described in detail in U.S. Pat. No. 5,557,742.

More specifically, a signature may include a signature event such as a particular pattern of bits. For example, the pattern may identify an incoming message that is designed to induce a deliberate violation of a communication protocol, where the kind of violation may be indicative of a malicious attack. Associated with a signature event there may be a signature event counter for counting the number of times the signature event occurs. Associated with the signature event and the signature event counter there may be a signature threshold that may be used to differentiate between attempted intrusions and uneventful occurrences of the signature event. For example, the signature event may be required to occur J times in K minutes before an intrusion is suspected. Thus, for example, more than five occurrences in twenty minutes of the signature event "protocol violation 3" may be used as an indicator that an unauthorized party may be attempting to intrude upon the operation of the protected computer.

An alert is generated when the intrusion detection system observes activity that is suggestive of an intrusion. The purpose of the alert is to inform a network administrator of the suspected attack, so that the administrator may take action to minimize the damage done by the intruder. Often, alerts from a number of intrusion detection sensors may be sent through an intrusion detection server that functions as an intermediary between the sensors and the network administrator. An unfortunate consequence of this architecture is that the intrusion detection server may impose an upper bound on the performance of the intrusion detection system.

This bound becomes critical when a vandal or hacker attacks a target such as an Internet web server by flooding the target with a torrential flow of disruptive messages that overload the target to the point of functional failure. Attacks of this kind are called "denial of service" attacks. During a denial of service attack, the vandal may fraudulently assume a number of different electronic identities, often by including messages in the disruptive flow that have a variety of source addresses. Such a vandal may be called a spoofer.

In one kind of denial-of-service attack, a spoofer may send the target a large number of Internet Control Message Protocol (ICMP) messages called Packet INternet Gropers (PINGS), which are normally used to query whether a particular Internet address is accessible to the sender. Upon receiving a PING, the target responds to the spoofed device rather than the vandal, as the PING bears the fraudulently used identity of the spoofed device. By flooding the target with PINGS, the vandal may divert the target's resources to generating responses and consequently away from its legitimate tasks, and may also cause unproductive network congestion by triggering a flood of response messages.

In another kind of denial-of-service attack, the vandal may send the target a large number of TCP SYN messages. A TCP SYN message is normally used to initiate a TCP connection. Upon receiving a SYN massage, the target sends a SYN/ACK message to the spoofed device rather than the vandal, as the SYN message bears the fraudulently used identity of the spoofed device. Further, the target reserves an internal data structure presumably to be used in supporting a connection with the spoofed device. So, by flooding the target with a large number of SYN messages, the vandal causes not only the problems mentioned above—resource diversion and network congestion—but also exhausts the target's capacity to support the data structures needed to establish other connections. Thus, the target is left unable to establish connections with any device except the spoofed device.

To combat such attacks, a computer may rely upon protective equipment that filters incoming messages according to information provided by the intrusion detection system. The intrusion detection system's intrusion detection sensors detect the onslaught of a vandal's attack, read the source addresses or other markings that the vandal usurps and fraudulently re-uses, and sends out alerts, through the intrusion detection server, intended to inform the network administrator of the attack. The administrator may then configure the filtering equipment to block incoming messages that seem to originate from the malicious source.

When a typical denial-of-service attack involves an onslaught of incoming messages, the intrusion detection sensors produce an intense outpouring of alerts, which are typically funneled through the intrusion detection server for correlation on behalf of the network administrator. Due to the intensity of the flow of alerts, the intrusion detection server may itself become overwhelmed. As a result, the intrusion detection system may fail when it is most critically needed, or queues and delays may result that prevent the server or the administrator from receiving crucial information in a timely way. Consequently, the capability of the intrusion detection system to defend against a denial-of-service attack is significantly limited.

Thus there is a need for improving the operation of an intrusion detection system, so that it may provide a stronger and more reliable defense against denial-of-service attacks by vandals intended to overwhelm both the protected device and the intrusion detection system itself by flooding them with a torrent of disruptive inbound messages.

SUMMARY

The present invention improves the operation of an intrusion detection system by altering signature events and signature thresholds when the intrusion detection system encounters a denial of service attack, in order to decrease the rate at which intrusion detection sensors send alerts to an intrusion detection server, and thereby to decrease the likelihood that the intrusion detection server will fail or that troublesome queues and resulting delays will build.

In the description that follows, the concept of a signature mentioned above is enlarged here to become a signature set. A signature set may include the following elements: a signature event, a signature event counter, a signature threshold quantity, and a signature threshold interval. An exemplary signature set might include the signature event "PING from source address 01.02.03.04," a signature event counter for the signature event, a signature threshold quantity "five PINGs," and a signature threshold interval "one minute," which is used as a sliding window to purge entries beyond a specified age from the signature event counter.

According to the present invention, each intrusion detection sensor has a governor. The governor may include an alert log, a timer, an alert-generation-rate threshold, and one or more rules that prescribe actions to be taken in order to slow or decrease the generation rate of alerts by the intrusion detection sensor when the present alert-generation rate exceeds the alert-generation-rate threshold.

When an intrusion detection sensor generates an alert, the governor records the time of the generation of the alert in the log, and determines, from the contents of the log, the present alert-generation rate (i.e., the rate at which the sensor is presently generating alerts). The present alert-generation rate is compared with the alert-generation-rate threshold. When the present alert-generation rate exceeds the alert-generation-rate threshold, the governor alters one or more elements of the signature set in order to slow or decrease the sensor's alert generation rate. For example, to slow the sensor's alert-generation rate, the governor might increase the signature threshold quantity, or decrease the signature threshold interval. In another case, the governor might temporarily suspend alerts generated for a particular signature set.

Thus, the governor automatically alters signature sets to decrease the generation of alerts when the intrusion detection sensor's present alert-generation rate exceeds the alert-generation-rate threshold. As a result, the demands on the intrusion detection server are reduced during a denial-of-service attack, and the intrusion detection server is less likely to be overwhelmed by its own intrusion detection sensors. Consequently, the performance of the intrusion detection system is improved, and the attack upon the protected device will not cause the denial-of-service condition on the intrusion detection system. These and other aspects of the invention will be more fully appreciated when considered in the light of the following detailed description and drawings.

DETAILED DESCRIPTION

The present invention systematically decreases the rate at which intrusion detection sensors generate alerts during denial-of-service attacks upon a protected device, and thereby improves the operation of an intrusion detection system by decreasing the likelihood that its intrusion detection server will itself be overwhelmed by the denial-of-service attack.

Figure 1:
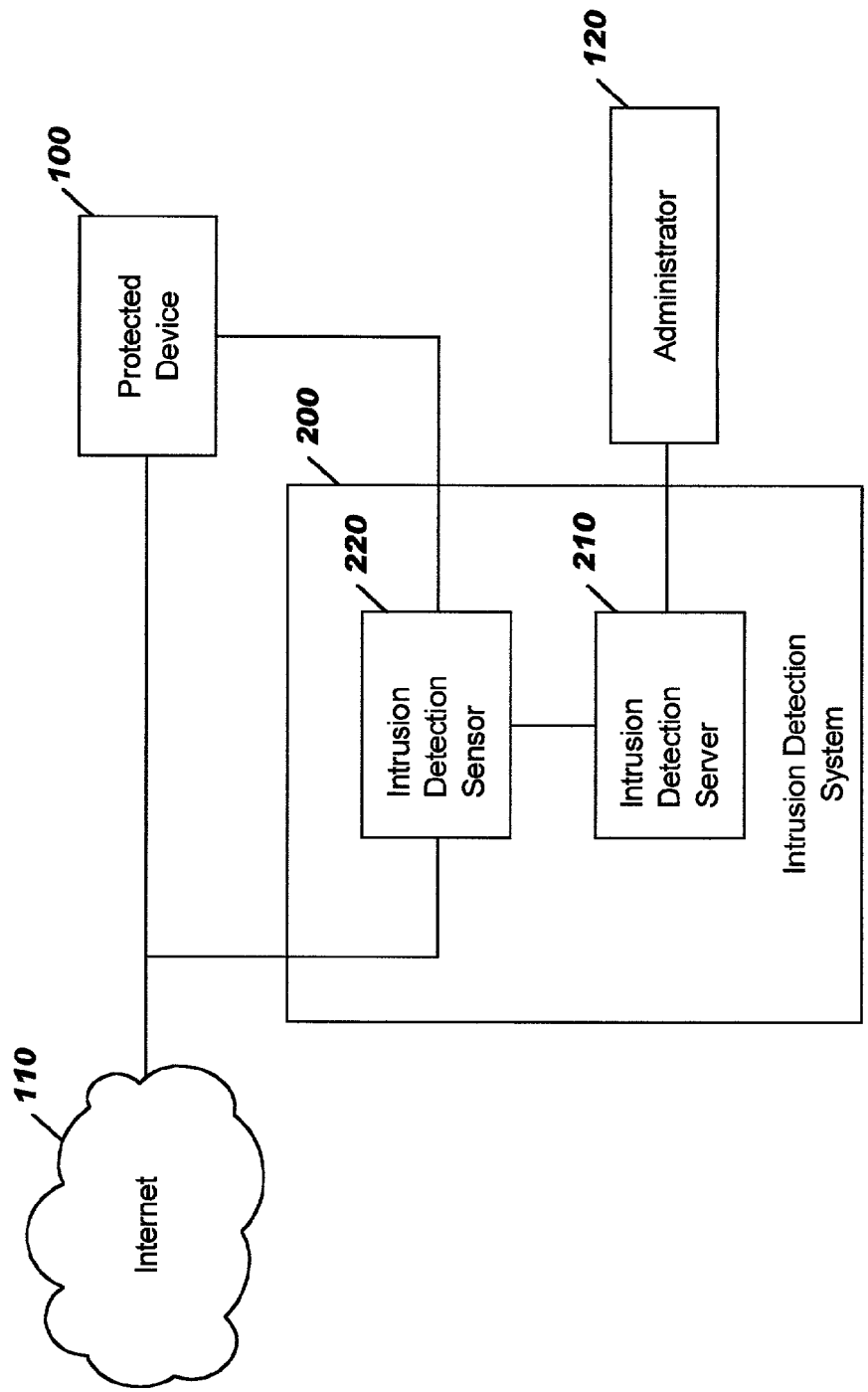
FIG. 1 shows an environment suitable for use of the present invention.

FIG. 1 shows an exemplary environment that is suitable for use of the present invention. In FIG. 1, a protected device 100 such as a computer, web server, workstation, or other similar device is connected to the Internet 110 or other communication network. Messages flow to the protected device 100 from sources local to the protected device 100, or from other sources (not shown) also connected to the Internet 110 or other communication network. Some of these messages may be emissaries of an attempt to intrude upon the protected device 100, such as an attempt to impede the operation of the protected device 100 by a denial-of-service attack. FIG. 1 also shows an intrusion detection system 200, the primary purpose of which is to detect such intrusions by alerting an administrator 120 of suspected intrusions. The intrusion detection system 200 includes an intrusion detection server 210 and an intrusion detection sensor 220. Although FIG. 1 shows only a single protected device 100 and a single intrusion detection sensor 220, the intrusion detection server 210 may protect more than one device and may have more than one intrusion detection sensor.

Figure 2:
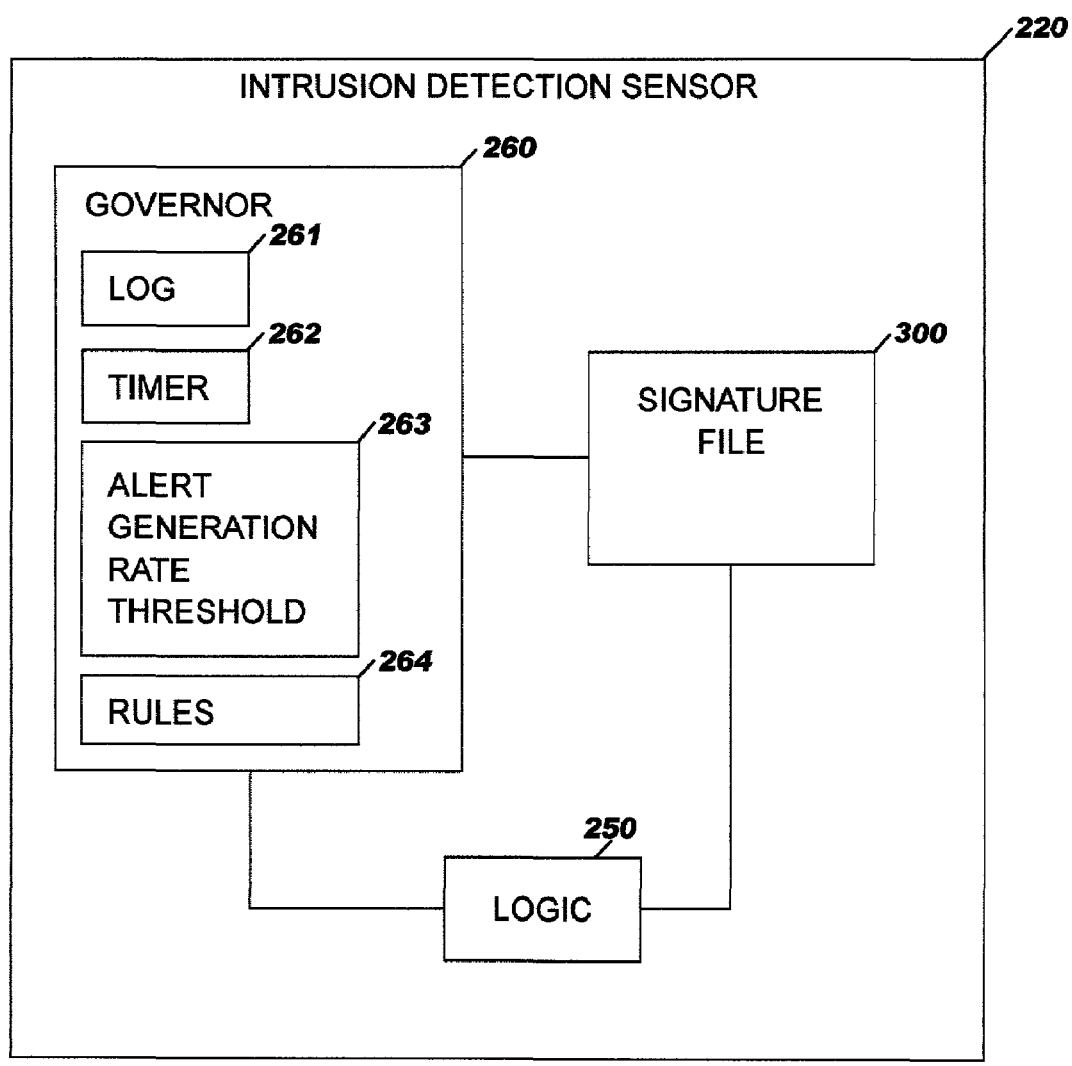
FIG. 2 shows aspects of the structure of an illustrative intrusion detection sensor according to the present invention.

FIG. 2 shows aspects of the structure of an intrusion detection sensor 220 according to the present invention. As shown in FIG. 2, the inventive intrusion detection sensor 220 includes logic 250, which may be a programmable processor and which oversees the operation of the intrusion detection sensor 220, a governor 260, and a signature file 300. The governor 260, which may be implemented as instructions executed by the logic 250, includes a log 261. Occurrences of alerts generated by the intrusion detection sensor 220 are recorded in the log 261; in one embodiment of the invention, the log is simply a list of timestamps that record the times at which the intrusion detection sensor 220 generates alerts. The timestamps may be used as described below to determine the present alert-generation rate of the intrusion detection sensor 220 (i.e., the rate at which the intrusion detection sensor 220 generates alerts at present). The governor 260 may also include a timer 262 for entering timestamps into the log 161, an alert-generation-rate threshold 263, which serves a point of comparison for the present alert-generation rate, and a rule or set of rules 264 that may be applied to elements of a signature set in response to the outcome of a comparison of the present alert-generation rate with the alert-generation-rate threshold 263. Operation of the timer 262, alert-generation-rate threshold 263, and rules 264 may be carried out by instructions executed by the logic 250.

Figure 3:
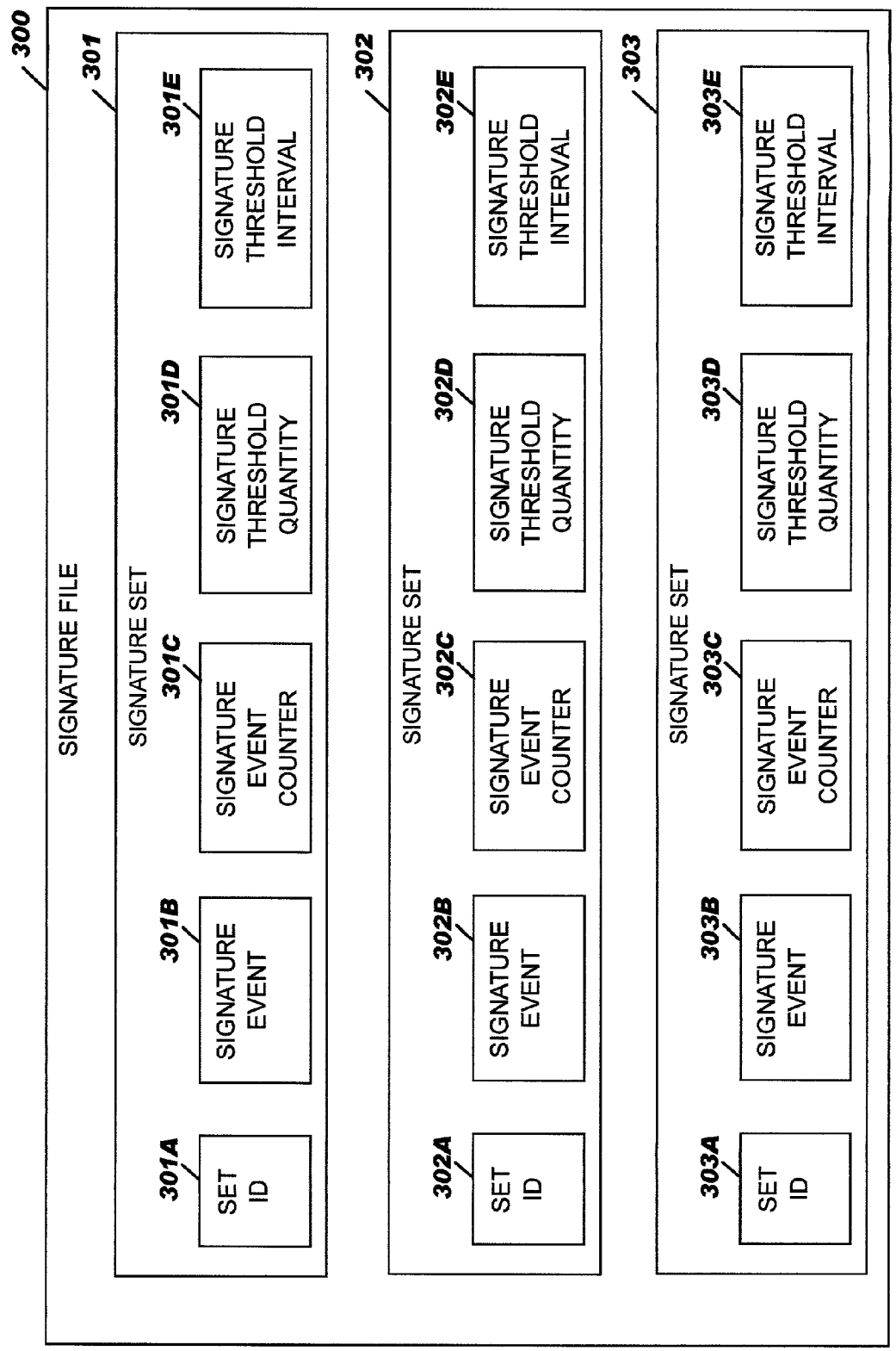
FIG. 3 shows an illustrative structure of a signature file available to the intrusion detection sensor of FIG. 2.

FIG. 3 illustrates an exemplary structure of the signature file 300, wherein three exemplary signature sets 301 through 303 are shown. The number three is selected here only for purposes of illustration; the present invention encompasses numbers of signature sets both greater than three and less than three as well as equal to three. As shown in FIG. 3, the signature sets 301 through 303 may include signature set identifiers 301A through 303A, signature events 301B through 303B, signature event counters 301C through 303C, signature threshold quantities 301D through 303D, and signature threshold intervals 301E through 303E. Thus, each signature set makes an association among a signature set identifier, a signature event, a signature event counter, a signature threshold quantity, and a signature threshold interval.

Within the signature sets 301 through 303 of FIG. 3, the signature set identifiers 301A through 303A may include alphanumeric tags, such that no two of the individual signature sets 301 through 303 have signature set identifiers 301A through 303A with equal alphanumeric values.

Within the signature sets 301 through 303 of FIG. 3, the signature events 301B through 303B may include bit patterns or other identifiers suggestive of attempted intrusions. For example, one of the signature events 301B through 303B might be a bit pattern associated with the event "Protocol violation 3" that is known to be a prelude to a denial-of-service attack. Another of the signature events 301B through 303B might be a bit pattern associated with the event "arrival of a message from source ID aaa.bbb.ccc.ddd," where the specified source ID is known to have been used in the past by a hacker.

Within the signature sets 301 through 303 of FIG. 3, the signature event counters 301C through 303C keep count of the numbers of occurrences of the associated signature events 301B through 303B, recording timestamps associated with the arrival of each counted signature event. With each occurrence of a signature event, the value of the associated signature event counter may be increased by one and a timestamp recorded (or just the timestamp recorded and the number of timestamps counted later); this method of operation is not a necessary condition of the present invention, however, and a signature event counter may be incremented or decremented in other ways responsive to the occurrence of an associated signature event.

Within the signature sets 301 through 303 of FIG. 3, the signature threshold quantities 301D through 303D may include decision-level information, count-reset instructions for the signature event counters 301C through 303C, and so forth. Decision-level information may be a numerical value, for example "ten or more occurrences of the signature event," that specifies the number of occurrences of the associated signature event needed to trigger the generation of an alert. Reset instructions may be instructions for resetting the associated signature event counter, for example "reset associated signature event counter upon ten occurrences" or "reset associated signature event counter every sixteen minutes."

Within the signature sets 301 through 303 of FIG. 3, the signature threshold intervals 301E through 303E may include intervals of time used as sliding windows that remove signature events past a specified age from the counts maintained by the signature event counters 301C through 303C. For example, a signature event interval 301E of five minutes would specify that an occurrence of a signature event 301B more than five minutes old should be taken out of the count maintained by the associated signature event counter 301C.

As discussed below, the rules 264 may be imposed upon elements of the signature sets, including the signature events 301B through 303B, the signature threshold quantities 301D through 303D, or the signature threshold intervals 301E through 303E, causing these elements to be altered advantageously in response to the beginning or ending of a denial-of-service attack.

Figure 4:
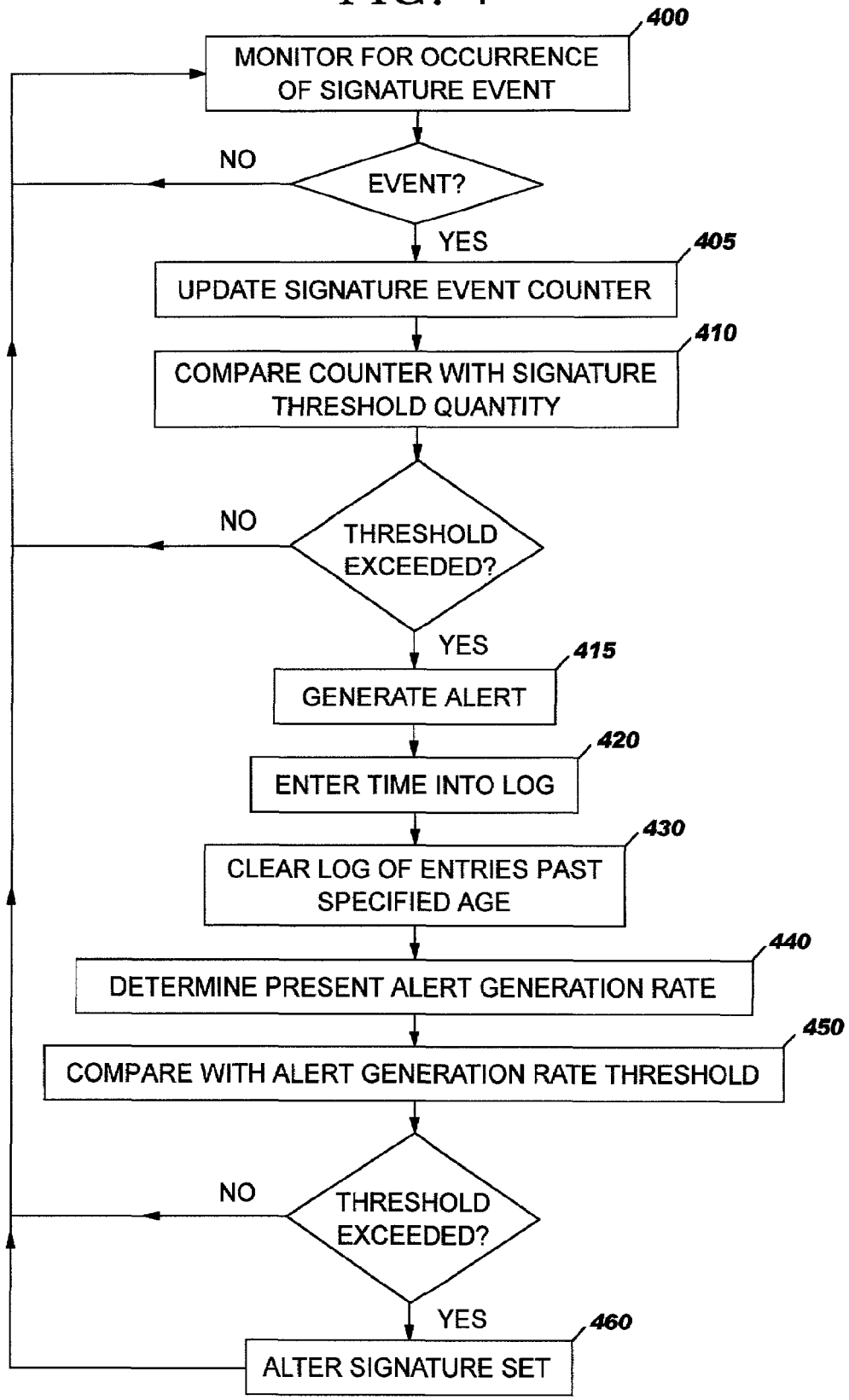
FIG. 4 shows aspects of the operation of the intrusion detection sensor of FIG. 2 according to the present invention.

FIG. 4 shows aspects of the operation of the logic 250 of the intrusion detection sensor 220 according to the present invention. For clarity, the operation of the logic 250 is described below when applied to one individual signature set 301 of the signature file 300; the same operations apply, of course, to the other signature sets held by the signature file 300 of the intrusion detection sensor 220.

As shown in FIG. 4, the intrusion detection sensor 220 monitors system activity involving the protected device 100, awaiting the occurrence of the signature event 301B (step 400). Until the signature event 301B occurs, the intrusion detection sensor 220 continues to monitor for the occurrence of the signature event 301B (step 400).

Otherwise (i.e., the signature event 301B occurs), the value of the associated signature event counter 301C is updated accordingly, for example increased by one (step 405). The value of the signature event counter 301C is then compared with the associated signature threshold quantity 301D (step 410), which, as mentioned above, is maintained according to a sliding time window specified by the associated signature threshold interval 301E (i.e., entries past an age specified by the signature threshold interval 301E are removed from the count of the signature event counter 301C). If the value of the signature event counter 301C does not exceed the associated signature threshold quantity 301D, the intrusion detection sensor 220 returns to await the arrival of another occurrence of the signature event 301B (step 400).

Otherwise (i.e., the value of the signature event counter 301C exceeds the signature threshold quantity 301D, and a potential intrusion has therefore been detected), the intrusion detection sensor 220 generates an alert and sends the alert to the intrusion detection server 210 (step 415).

The governor 260 enters the time the alert is generated into the log 261 (step 420), and if more than one signature set is under consideration enters the appropriate signature set identifier 301A, and then clears the log 261 of any entries that are past a permissible age (step 430). The permissible age may be tied to the alert-generation-rate threshold and the cap to be imposed by the governor 160 upon the rate of generation of alerts by the intrusion detection sensor 220. For example, if the cap were a maximum output of 100 alerts in two seconds, then the alert-generation-rate threshold could be 100 and the permissible age could be two seconds.

The governor 260 then determines the present alert-generation rate of the intrusion detection sensor 220 (step 440). For example, the present alert-generation rate may be computed by counting the number of timestamps found in the log 261, and dividing the result by the permissible age (or equivalently by multiplying the number of timestamps by a coefficient proportional to the permissible age). The present alert-generation rate is then compared with the alert-generation-rate threshold 263 (step 450). If the present alert-generation rate does not exceed the alert-generation-rate threshold 263, the intrusion detection sensor 220 returns to monitor for the occurrence of the signature event 301B (step 400).

Otherwise (i.e., the present alert-generation rate exceeds the alert-generation-rate threshold 263), the governor 260 alters one or more elements of the signature file 301 in order to decrease the alert generation rate (step 460) of the intrusion detection sensor 220. The governor 260 may increase the value of the signature threshold quantity 301D relatively or absolutely (e.g., quadruple the value of the signature threshold quantity, or change "alert on five occurrences of the signature event" to "alert on twenty occurrences of the signature event"), decrease the signature threshold interval 301E relatively or absolutely (e.g., halve the signature threshold interval, or change "30 seconds" to "15 seconds"), or suspend the generation of alerts on the occurrence of the signature event 301B altogether (e.g., "stop generating alerts based on observation of protocol violation 3"). The intrusion detection sensor 220 then returns to monitor for the occurrence of the signature event 301B (step 400).

Figure 5:
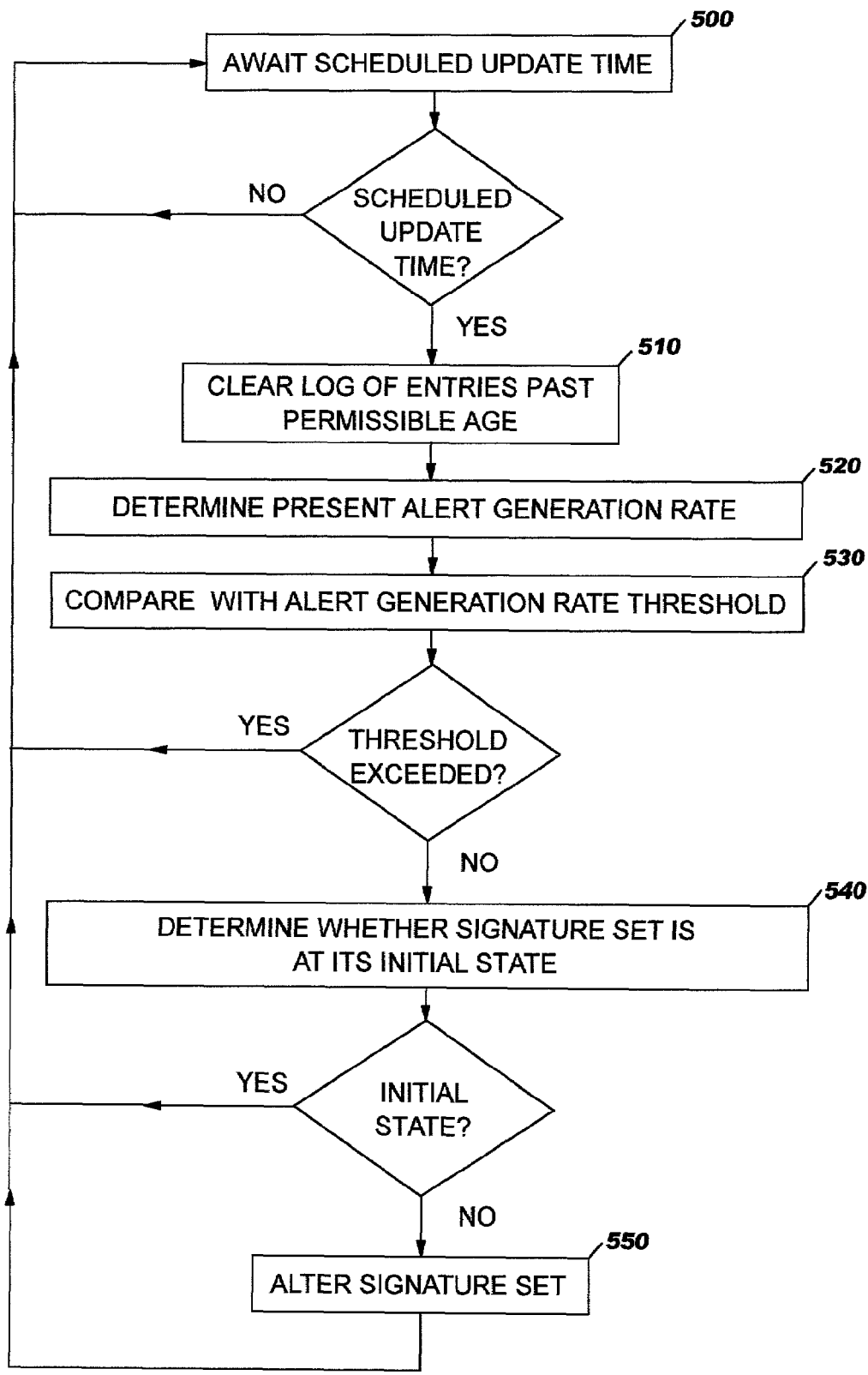
FIG. 5 shows housekeeping operations associated with the intrusion detection sensor of FIG. 2.

FIG. 5 shows the operation of ancillary aspects of the intrusion detection sensor 220. The governor 260 awaits the occurrence of a scheduled update time (step 500). When the current time is not a scheduled update time, the governor 260 continues to await the occurrence of a scheduled update time (step 500). Otherwise (i.e., the current time is a scheduled update time), the governor 260 clears the log 261 of any entries that are past the permissible age described above (step 510). This is a regularly scheduled operation to clear the log 261 in the absence of the immediate occurrence of the signature event 301B, and is in addition to the event-driven clearing of the log 261 mentioned above (in step 430 of FIG. 4). The governor 260 then determines the present alert-generation rate (step 520), in order to determine whether the denial-of-service attack has ended, in which case the intrusion detection set 301 may be restored to its initial state. For example, the present alert-generation rate may be computed by counting the number of timestamps in the log 261, and dividing the result by the permissible age. The present alert-generation rate is then compared with the alert-generation-rate threshold 263 (step 530).

If the present alert-generation rate exceeds the alert-generation-rate threshold 263, the governor 260 returns to monitor for the occurrence of an update time (step 500), as the denial-of-service attack is evidently still ongoing. Otherwise (i.e., the present alert-generation rate does not exceed the alert-generation-rate threshold 263), the governor 260 determines whether the signature set 301 is at its initial state (step 540), which is the state of the signature set 301 prior to any changes made by the governor 260 in the course of the operations described above with reference to FIG. 4.

If the signature set 301 is at its initial state, the governor 260 returns to await a scheduled update time (step 500). Otherwise (i.e., the signature set 301 is not at its initial state), the governor 260 alters one or more elements of the signature set 301 (step 550). For example, the governor 260 may decrease the value the signature threshold quantity 301D relatively or absolutely (e.g., quarter the signature threshold quantity, or change "alert on twenty occurrences of the signature event" to "alert on five occurrences of the signature event"), increase the signature threshold interval 301E relatively or absolutely (e.g., double the signature threshold interval," or change "15 seconds" to "30 seconds"), or resume the generation of alerts on the occurrence of the signature event 301B suspended earlier (e.g., "resume generating alerts based on observation of protocol violation 3").

Form the foregoing description, those skilled in the art will appreciate that the present invention improves the performance of an intrusion detection system, whether the intrusion detection system is a sensor-server system or an integrated unit, by controlling the rate at which alerts are generated during a denial-of-service attack, so that the intrusion detection system is not itself overwhelmed by the denial-of-service attack. The foregoing description is illustrative rather than limiting, however, and the scope of the present invention is limited only by the following claims.

We claim:

1. A method of operating an intrusion detection system, comprising the steps of:
  monitoring, by the intrusion detection system, for occurrence of a signature event that is indicative of a denial of service intrusion on a protected device, said denial of service intrusion attempting to impede operation of the protected device,
  wherein the intrusion detection system comprises an intrusion detection server and an intrusion detection sensor,
  wherein the intrusion detection sensor is coupled to the intrusion detection server and to the protected device,
  wherein the intrusion detection sensor comprises a governor, a programmable processor that oversees operation of the intrusion detection sensor, and a signature file,
  wherein the governor includes a log, a timer, an alert generation rate threshold, and one or more rules that prescribe actions to be taken in order to decrease the generation rate of alerts by the intrusion detection sensor when the present alert generation rate exceeds the alert generation rate threshold,
  wherein operation of the timer, utilization of the alert generation rate threshold, and implementation of the one or more rules are carried out by instructions executed by the programmable processor,
  wherein the log consists of a list of timestamps that record the times at which the intrusion detection sensor generates alerts,
  wherein the signature file includes a signature set comprising elements that include a signature set identifier, a signature event, a signature event counter that keeps count of the number of occurrences of the signature event, a signature threshold quantity, and a signature threshold interval, and
  wherein the signature event includes a bit pattern that identifies the signature event,
 responsive to said monitoring determining that the signature event occurs, increasing a value of the signature event counter and comparing the value of the signature event counter with the signature threshold quantity;
 adjusting the value of the signature event counter to not include a count of signature events past a sliding window specified by the signature threshold interval; and
 for each occurrence of the value of the signature event counter exceeding the signature threshold quantity:
  generating an alert by the intrusion detection sensor;
  after said generating, recording in the log a timestamp denoting a time of generating the alert, said time of generating the alert derived from the timer;
  after said recording, clearing the log of any entries that are past a permissible age, said permissible age equal to a ratio of a cap imposed by the governor upon a rate of generation of alerts by the intrusion detector sensor to the alert generation rate threshold;
  after said clearing, determining from contents of the log the present alert generation rate, said determining the present alert generation rate comprising dividing the number of timestamps in the log by the permissible age;
  after said determining, comparing the present alert generation rate with the alert generation rate threshold, said comparing ascertaining that the present alert generation rate exceeds the alert generation rate threshold;
  responsive to said ascertaining that the present alert generation rate exceeds the alert generation rate threshold, altering an element of the signature set to decrease a rate at which alerts are generated by the intrusion detection sensor, said altering the element being implemented in accordance with said one or more rules.

2. The method of claim 1, wherein the element is the signature threshold quantity, and wherein said altering the element comprises increasing the signature threshold quantity.

3. The method of claim 1, wherein the element is the signature threshold interval that specifies a sliding time window, and wherein said altering the element comprises decreasing the signature threshold interval.

4. The method of claim 1, wherein said generating the alert comprises alerting an administrator of suspected denial of service intrusions upon the protected device.

5. The method of claim 1, wherein the protected device is selected from the group consisting of a computer, a web server, and a workstation.

6. The method of claim 1, further comprising the steps of:
awaiting, by the governor, for occurrence of a scheduled update time;
for each scheduled update time occurrence: clearing the log of any entries that are past the permissible age, determining from contents of the log the current alert generation rate by dividing the number of timestamps in the log by the permissible age, and comparing the current alert generation rate with the alert generation rate threshold; and
for each occurrence of the current alert generation rate exceeding the alert generation rate threshold: ascertaining that the signature set of the intrusion detection system is at its initial state at which no changes in the signature set have been made by the governor, and altering one or more elements of the signature set in response to said ascertaining.

7. Programmable media containing programmable software for operation of an intrusion detection system, programmable software comprising the steps of:
monitoring, by the intrusion detection system, for occurrence of a signature event that is indicative of a denial of service intrusion on a protected device, said denial of service intrusion attempting to impede operation of the protected device,
wherein the intrusion detection system comprises an intrusion detection server and an intrusion detection sensor,
wherein the intrusion detection sensor is coupled to the intrusion detection server and to the protected device,
wherein the intrusion detection sensor comprises a governor, a programmable processor that oversees operation of the intrusion detection sensor, and a signature file,
wherein the governor includes a log, a timer, an alert generation rate threshold, and one or more rules that prescribe actions to be taken in order to decrease the generation rate of alerts by the intrusion detection sensor when the present alert generation rate exceeds the alert generation rate threshold,
wherein operation of the timer, utilization of the alert generation rate threshold, and implementation of the one or more rules are carried out by instructions executed by the programmable processor,
wherein the log consists of a list of timestamps that record the times at which the intrusion detection sensor generates alerts,
wherein the signature file includes a signature set comprising elements that include a signature set identifier, a signature event, a signature event counter that keeps count of the number of occurrences of the signature event, a signature threshold quantity, and a signature threshold interval, and
wherein the signature event includes a bit pattern that identifies the signature event;
responsive to said monitoring determining that the signature event occurs, increasing a value of the signature event counter and comparing the value of the signature event counter with the signature threshold quantity;
adjusting the value of the signature event counter to not include a count of signature events past a sliding window specified by the signature threshold interval; and
for each occurrence of the value of the signature event counter exceeding the signature threshold quantity:
generating an alert by the intrusion detection sensor;
after said generating, recording in the log a timestamp denoting a time of generating the alert, said time of generating the alert derived from the timer;
after said recording, clearing the log of any entries that are past a permissible age, said permissible age equal to a ratio of a cap imposed by the governor upon a rate of generation of alerts by the intrusion detector sensor to the alert generation rate threshold;
after said clearing, determining from contents of the log the present alert generation rate, said determining the present alert generation rate comprising dividing the number of timestamps in the log by the permissible age;
after said determining, comparing the present alert generation rate with the alert generation rate threshold, said comparing ascertaining that the present alert generation rate exceeds the alert generation rate threshold;
responsive to said ascertaining that the present alert generation rate exceeds the alert generation rate threshold, altering an element of the signature set to decrease a rate at which alerts are generated by the intrusion detection sensor, said altering the element being implemented in accordance with said one or more rules.

8. The programmable media of claim 7, wherein the element is the signature threshold quantity, and wherein said altering the element comprises increasing the signature threshold quantity.

9. The programmable media of claim 7, wherein the element is the signature threshold interval that specifies a sliding time window, and wherein said altering the element comprises decreasing the signature threshold interval.

10. The programmable media of claim 7, wherein said generating the alert comprises alerting an administrator of suspected denial of service intrusions upon the protected device.

11. The programmable media of claim 7, wherein the protected device is selected from the group consisting of a computer, a web server, and a workstation.

12. The programmable media of claim 7, wherein the programmable software further comprises the steps of:
awaiting, by the governor, for occurrence of a scheduled update time;
for each scheduled update time occurrence: clearing the log of any entries that are past the permissible age, determining from contents of the log the current alert generation rate by dividing the number of timestamps in the log by the permissible age, and comparing the current alert generation rate with the alert generation rate threshold; and for each occurrence of the current alert generation rate exceeding the alert generation rate threshold: ascertaining that the signature set of the intrusion detection system is at its initial state at which no changes in the signature set have been made by the governor, and altering one or more elements of the signature set in response to said ascertaining.

* * * * *